(12) United States Patent
Duffy et al.

(10) Patent No.: US 10,962,118 B2
(45) Date of Patent: Mar. 30, 2021

(54) SEAL ASSEMBLY WITH VIBRATION DAMPING BRISTLES

(71) Applicant: UNITED TECHNOLOGIES CORPORATION, Farmington, CT (US)

(72) Inventors: Kevin Duffy, Hartford, CT (US); Brady Walker, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 121 days.

(21) Appl. No.: 16/155,458

(22) Filed: Oct. 9, 2018

(65) Prior Publication Data

US 2020/0109785 A1 Apr. 9, 2020

(51) Int. Cl.
*F16J 15/36* (2006.01)

(52) U.S. Cl.
CPC .................................. *F16J 15/366* (2013.01)

(58) Field of Classification Search
CPC F16J 15/366; F16J 15/36; F16J 15/363; F16J 15/34; F16J 3/04; F16J 3/048
See application file for complete search history.

(56) References Cited

U.S. PATENT DOCUMENTS

| 1,366,879 | A | * | 1/1921 | Dennedy | F16J 15/36 |
| | | | | | 277/368 |
| 3,276,780 | A | * | 10/1966 | Andresen | F16J 15/366 |
| | | | | | 277/391 |
| 3,372,939 | A | * | 3/1968 | Coulombe | F16J 15/366 |
| | | | | | 277/391 |
| 3,515,394 | A | * | 6/1970 | Stevens | F16F 15/06 |
| | | | | | 277/391 |
| 3,747,943 | A | * | 7/1973 | Dietzel | F16J 15/187 |
| | | | | | 277/504 |
| 4,163,563 | A | * | 8/1979 | Mullaney | F16J 15/366 |
| | | | | | 277/379 |
| 4,365,816 | A | | 12/1982 | Johnson et al. | |
| 5,725,219 | A | | 3/1998 | Gilbert | |
| 5,873,574 | A | * | 2/1999 | Ringer | F16J 15/3476 |
| | | | | | 277/348 |
| 5,901,965 | A | * | 5/1999 | Ringer | F16J 15/363 |
| | | | | | 277/361 |
| 5,954,341 | A | * | 9/1999 | Ringer | F16J 15/363 |
| | | | | | 277/361 |

(Continued)

FOREIGN PATENT DOCUMENTS

| EP | 3263842 | 1/2018 |
| EP | 3284983 | 2/2018 |
| GB | 2407626 | 5/2005 |

OTHER PUBLICATIONS

European Patent Office, European Search Report dated Jan. 3, 2020 in Application No. 19201742.4.

*Primary Examiner* — Eugene G Byrd
(74) *Attorney, Agent, or Firm* — Snell & Wilmer L.L.P.

(57) ABSTRACT

A seal assembly includes a seal nose, a bellows, and a plurality of bristles. The seal nose is configured to be in sealing contact with a rotating seal plate, the bellows extends between and couples the seal nose to a support structure, and the plurality of bristles extends from the support structure toward the bellows, with at least one bristle of the plurality of bristles being in contact with the bellows to damp vibration of the bellows.

20 Claims, 6 Drawing Sheets

(56) References Cited

U.S. PATENT DOCUMENTS

| | | | |
|---|---|---|---|
| 7,021,632 B2 | 4/2006 | Grace | |
| 8,714,558 B2 * | 5/2014 | Berard | F16J 15/363 |
| | | | 277/358 |
| 9,845,888 B2 | 12/2017 | Furukawa et al. | |
| 2015/0184754 A1 * | 7/2015 | Furukawa | F16J 15/3464 |
| | | | 277/352 |

* cited by examiner

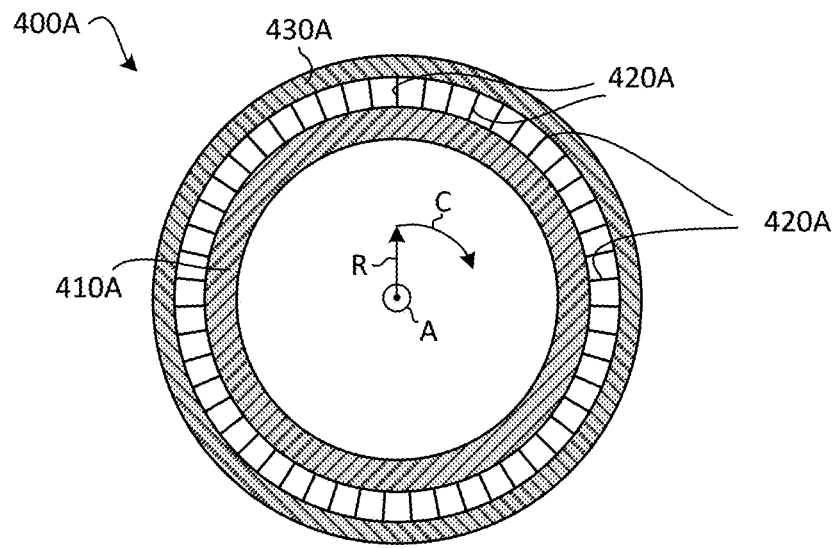
FIG. 4A
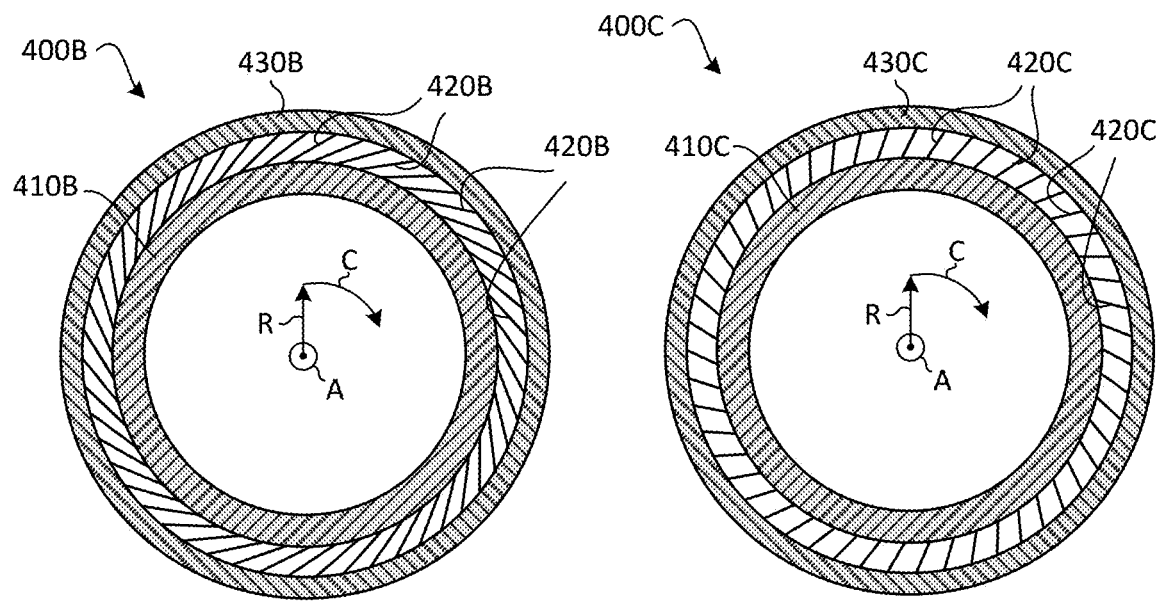
FIG. 4B                    FIG. 4C

US 10,962,118 B2

SEAL ASSEMBLY WITH VIBRATION DAMPING BRISTLES

FIELD

The present disclosure relates to seal assemblies, and more specifically, to vibration damping for seal assemblies.

BACKGROUND

Carbon face seals typically use a bellows to control the axial and/or radial position of a seal nose relative to a rotating seal plate. The bellows forms part of the boundary of the bearing compartment volume. The bellows allows for axial travel of the carbon seal nose while providing a load to keep the carbon nose seated against the rotating seal plate. Carbon seal bellows may have various vibration modes, which may negatively impact performance of the seal assembly due to cyclic load variation between the seal plate and carbon seal nose. Further, displacement caused by vibration modes may also result in stresses that may be higher than the material capability of the components of the seal assembly.

SUMMARY

In various embodiments, the present disclosure provides a seal assembly that includes a seal nose, a bellows, and a plurality of bristles. The seal nose is configured to be in sealing contact with a rotating seal plate, the bellows extends between and couples the seal nose to a support structure, and the plurality of bristles extends from the support structure toward the bellows, with at least one bristle of the plurality of bristles being in contact with the bellows to damp vibration of the bellows.

In various embodiments, the plurality of bristles are resiliently flexible. In various embodiments, the bellows is resiliently flexible. In various embodiments, the seal assembly further includes a bristle holder mounted to the support structure, wherein the plurality of bristles extends from the bristle holder. The bellows may be an annular structure, and the annular structure of the bellows may define a radial direction, an axial direction, and a circumferential direction. The plurality of bristles may be disposed radially outward of the bellows. In various embodiments, each bristle of the plurality of bristles extends radially such that each bristle is parallel to the radial direction. In various embodiments, each bristle of the plurality of bristles extends in a slanted direction relative to the radial direction. In various embodiments, the slanted direction is orthogonal to the axial direction.

Also disclosed herein, according to various embodiments, is a gas turbine engine that includes an engine central longitudinal axis. A radial direction, an axial direction, and a circumferential direction may be defined relative to the engine central longitudinal axis. The gas turbine engine may include a bearing compartment comprising a rotational member and a seal assembly. The seal assembly may include a support structure, a rotating sealing plate, a seal nose in sealing contact with the rotating seal plate, a bellows extending between and coupling the seal nose to the support structure, and a plurality of bristles extending from the support structure to engage the bellows. The plurality of bristles are configured to damp vibration of the bellows, according to various embodiments.

In various embodiments, the plurality of bristles is annular around the engine central longitudinal axis. In various embodiments, the plurality of bristles comprises multiple sections of bristles that are circumferentially distributed around the engine central longitudinal axis.

Also disclosed herein, according to various embodiments, is a method of assembling a gas turbine engine. The method may include mounting a plurality of bristles to a bristle holder, mounting the bristle holder to a support structure of the gas turbine engine, and coupling a seal nose to the support structure via a bellows, wherein at least a portion of the plurality of bristles at least partially engage the plurality bellows. In various embodiments, mounting the bristle holder to the support structure comprises positioning the bristle holder radially outward of the bellows.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 4A is a cross-sectional view, looking down an engine central longitudinal axis of a gas turbine engine, of a seal assembly, in accordance with various embodiments;

FIG. 4B is a cross-sectional view, looking down an engine central longitudinal axis of a gas turbine engine, of a seal assembly, in accordance with various embodiments;

FIG. 4C is a cross-sectional view, looking down an engine central longitudinal axis of a gas turbine engine, of a seal assembly, in accordance with various embodiments;

Figure 1:
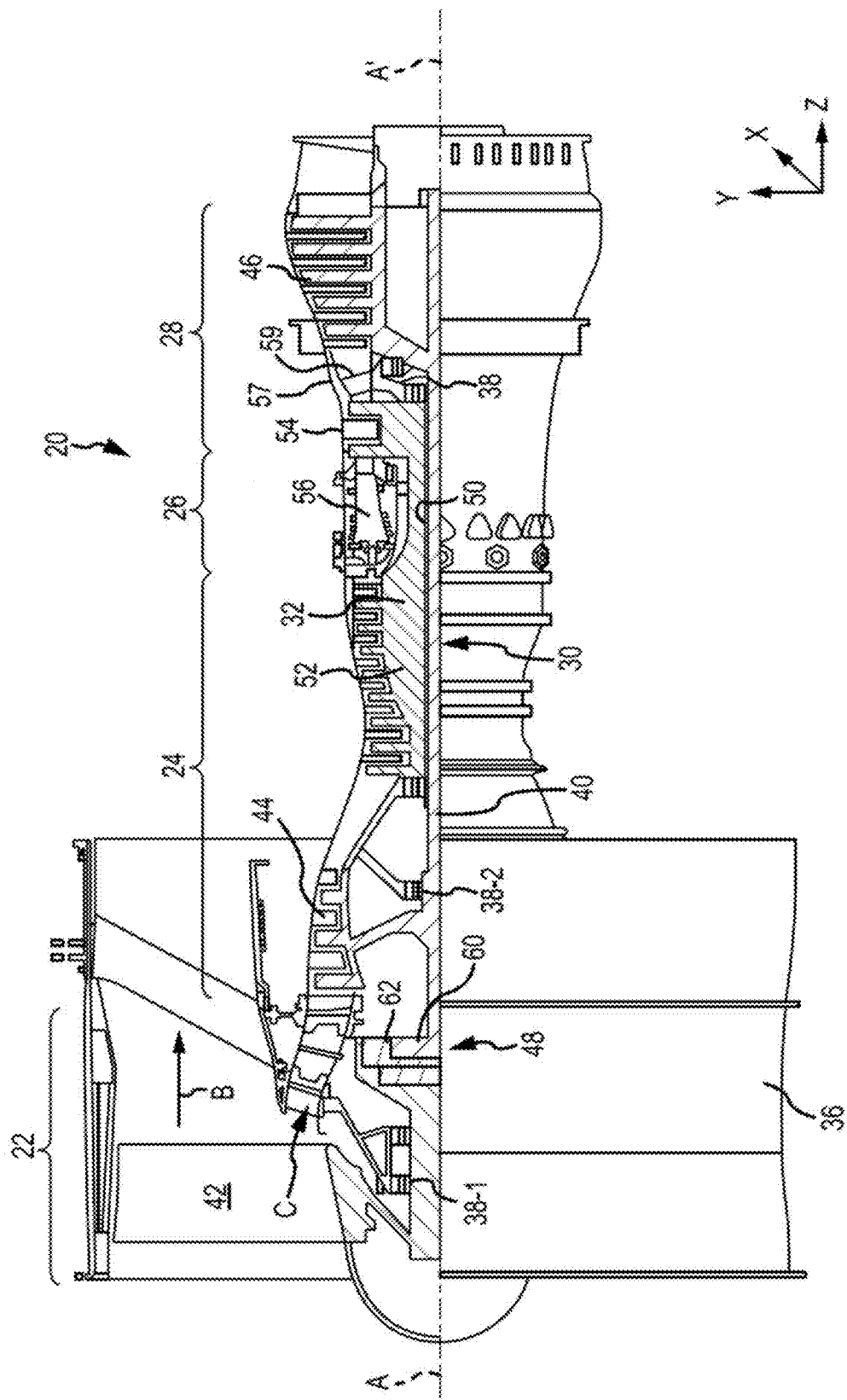
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a seal assembly that has a plurality of bristles that are configured to engage/interface with a bellows to damp (e.g., inhibit) excessive and/or resonant vibrational frequencies, thereby reducing mechanical stresses and improving the operational life of the seal assembly and the surrounding components. While numerous details are included herein pertaining to a seal assembly of a gas turbine engine, the details of the seal assembly provided herein may be utilized in various applications.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
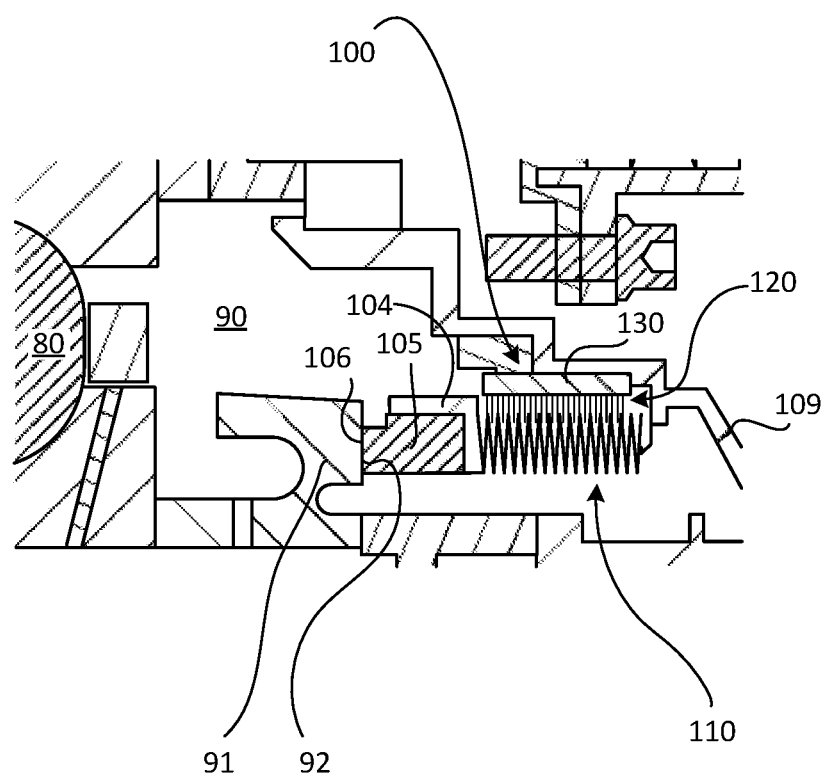
FIG. 2 is a cross-sectional view of a seal assembly and a bearing cavity, in accordance with various embodiments.
Figure 3:
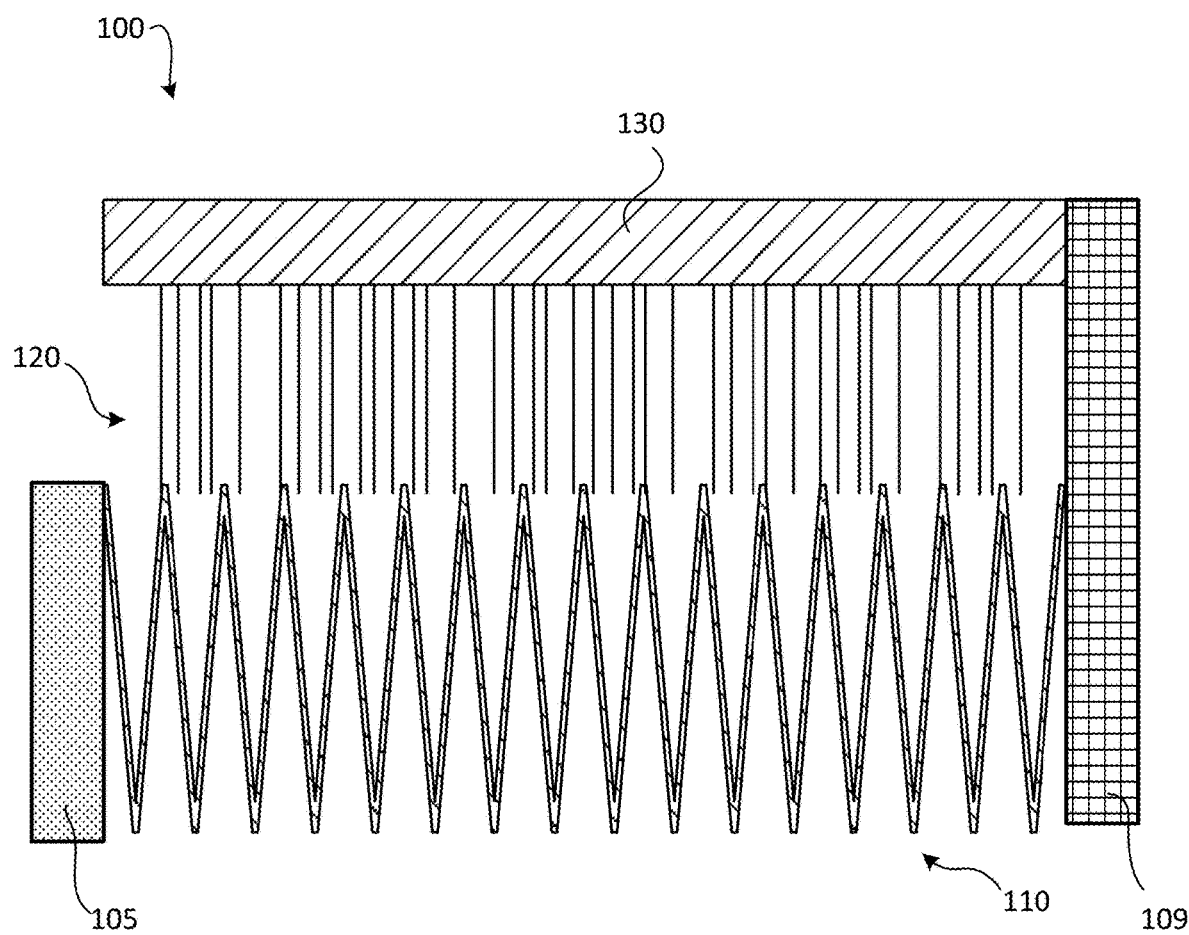
FIG. 3 is a cross-sectional view of a seal assembly, in accordance with various embodiments.

In various embodiments, and with reference to FIGS. 2 and 3, a seal assembly 100 is provided. The seal assembly 100 includes a seal nose 105 having a seal surface 106 configured to be in sealing contact with a face 92 of a rotating seal plate 91. The rotating seal plate 91 may be or may be coupled to a rotational member 80 of a bearing assembly. That is, the rotational member 80 of the bearing assembly may be a ball in a ball bearing, a roller in a roller bearing, and/or any other suitable type of rotational member. In order to lubricate and/or cool a bearing assembly, fluid may be passed within a bearing compartment 90 and throughout the bearing assembly within the bearing compartment. The fluid may be a liquid, such as oil, air, or any other suitable liquid or gas. With continued reference to FIGS. 2 and 3, and in accordance with various embodiments, seal assembly 100 may be configured to prevent fluid leakage from bearing compartment 90. The seal assembly 100 may further include a support structure 109 and a bellows 110 extending between the support structure 109 and the seal nose 105. The seal assembly 100, which includes the seal nose 105 and the bellows 110, may remain stationary (e.g., may be non-rotating) relative to axis of rotation (e.g., engine central longitudinal axis) during operation of the gas turbine engine. In various embodiments, seal nose includes carbon and/or any other suitable material. As used herein, the term "support structure" refers to any non-rotating structure in proximity to the rotating structure, according to various embodiments. That is, the term "support structure" may generally refer to any non-rotating structure/feature from which the bristles extend.

In various embodiments, the seal assembly 100 further includes a plurality of bristles 120 extending from the support structure 109 to engage the bellows 110 to damp vibration of the bellows 110. Said differently, undesired and potentially problematic operating vibration modes of the seal assembly are inhibited by the plurality of bristles 120 interfacing with the bellows 110. For example, vibrations propagating through the bellows 110 may be transferred/absorbed to the bristles 120 instead of propagating to the interface between the seal nose 105 and the sealing plate 91. The bristles may be resiliently flexible, and the bristles may be made from a metallic material or a non-metallic material (e.g., a thermoplastic material and/or composite material).

In various embodiments, the seal assembly 100 further includes a bristle holder 130 mounted to the support structure 109. The plurality of bristles 120 may extend from the bristle holder 130. The bristle holder 130 may be disposed radially outward of the bellows 110. In various embodiments, the overlap between the tips of the individual bristles and the corresponding edge of the bellows is less than 1/10 of an inch (0.25 centimeters). In various embodiments, this overlap is less than 1/100 of an inch (0.025 centimeters). In various embodiments, the overlap is less than 50/1000 of an inch (0.013 centimeters). In various embodiments, the portion of the individual bristles that overlaps the corresponding edge of the bellows is less than ½ the total length of the individual bristles. In various embodiments, the portion of the individual bristles that overlaps the corresponding edge of the bellows is less than 1/10 the total length of the individual bristles. In various embodiments, the portion of the individual bristles that overlaps the corresponding edge of the bellows is between 1/10 and 1/20 of the total length of the individual bristles. This relatively small overlap between the tips of the plurality of bristles 120 and the bellows 110 enables vibration damping, as described above, while preventing the bristles from excessively impacting the desired load of the bellows 110 and seal nose 105 against the rotating seal plate 91. That is, if the bristles were to extensively overlap with the bellows, the ability of the bellows to axially mechanically respond to the load between the seal nose 105 and the rotating seal plate 91 may deteriorate, thus compromising the ability of the seal assembly to provide a proper fluid seal.

In various embodiments, and with reference to FIGS. 4A, 4B, and 4C, various examples of the orientation of the bristles are provided. FIGS. 4A, 4B, and 4C depict cross-sections of annular seal assemblies as viewed along an axis of rotation, such as the engine central longitudinal axis of the gas turbine engine 20 of FIG. 1. FIGS. 4A, 4B, and 4C also include "A-R-C" axes that refer to and define an axial direction, a radial direction, and a circumferential direction, respectively. FIG. 4A, for example, shows a seal assembly 400A that includes an annular bellows 410A and an annular bristle holder 430A disposed radially outward of the bellows 410A. In various embodiments, the plurality of bristles 420A extending from the bristle holder 430A toward the bellows 410A extend radially (e.g., parallel to the radial direction). In various embodiments, and with reference to FIG. 4B, seal assembly 400B includes annular bellows 410B and annular bristle holder 430B disposed radially outward of the bellows 410B. The plurality of bristles 420B extend from the bristle holder 430B toward the bellows 410B in a slanted direction relative to the radial direction. In various embodiments, this slanted direction is orthogonal to the axial direction in order to avoid the aforementioned negative effect on the axial response of the bellows. The seal assembly 400C in FIG. 4C is similar to the seal assembly 400B of FIG. 4B, but with fewer bristles 420C and with the bristles 420C extending from the bristle holder 430C toward the bellows 410C at a less inclined angle.

Figure 5A:
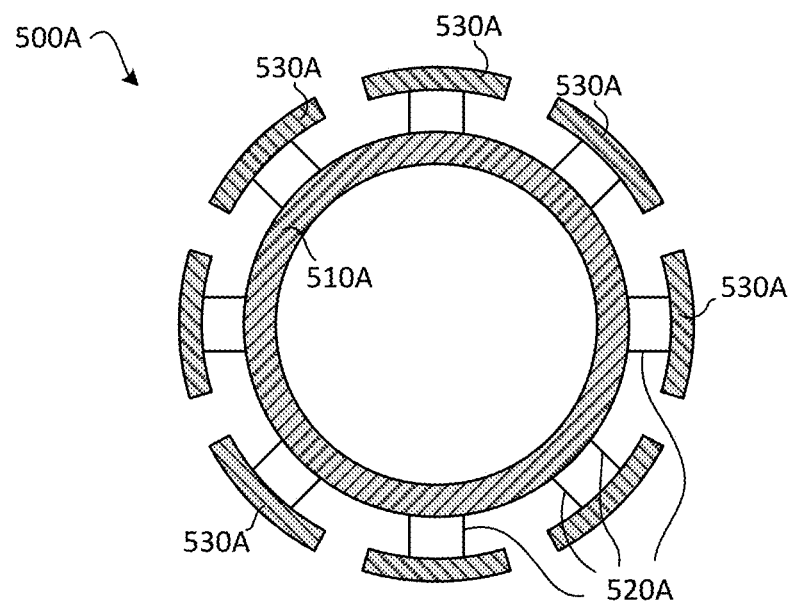
FIG. 5A is a cross-sectional view, looking down an engine central longitudinal axis of a gas turbine engine, of a seal assembly, in accordance with various embodiments.
Figure 5B:
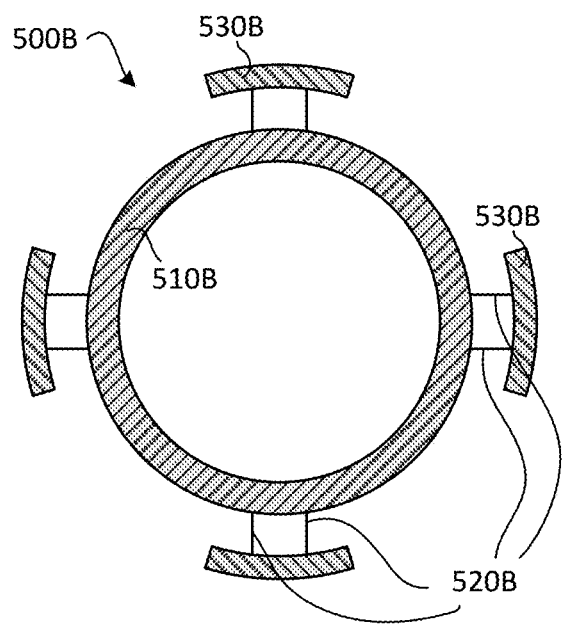
FIG. 5B is a cross-sectional view, looking down an engine central longitudinal axis of a gas turbine engine, of a seal assembly, in accordance with various embodiments.
Figure 5C:
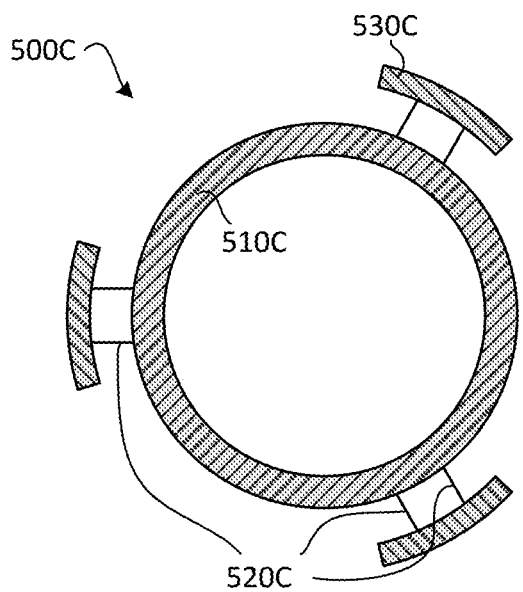
FIG. 5C is a cross-sectional view, looking down an engine central longitudinal axis of a gas turbine engine, of a seal assembly, in accordance with various embodiments.

In various embodiments, and with reference to FIGS. 5A, 5B, and 5C, the bristle holder and the plurality of bristles may not extend entirely around the rotational axis, but instead may be comprised of multiple sections of bristles that are circumferentially distributed around the engine central longitudinal axis. In various embodiments, and with reference to FIG. 5A, the seal assembly 500A may include a plurality of bristle holder sections 530A, distributed circumferentially around the engine central longitudinal axis, with each bristle holder section 530A having one or more bristles 520A extending therefrom toward the annular bellows 510A. For example, the number of bristle holder sections 530B may be eight. In various embodiments, and with reference to FIG. 5B, the seal assembly 500B may include a plurality of bristle holder sections 530B, distributed circumferentially around the engine central longitudinal axis, with each bristle holder section 530B having one or more bristles 520B extending therefrom toward the annular bellows 510B. For example, the number of bristle holder sections 530B may be four. In various embodiments, and with reference to FIG. 5C, the seal assembly 500C may include a plurality of bristle holder sections 530C, distributed circumferentially around the engine central longitudinal axis, with each bristle holder section 530C having one or more bristles 520C extending therefrom toward the annular bellows 510C. For example, the number of bristle holder sections 530C may be three. In various embodiments, the bristle holder, whether comprised of an annular structure or segmented sections, is disposed radially inward of the bellows such that the bristles extend radially outward (either parallel to the radial direction or slanted relative thereto, as described above) from the bristle holder to contact a radially inward edge of the bellows.

Figure 6:
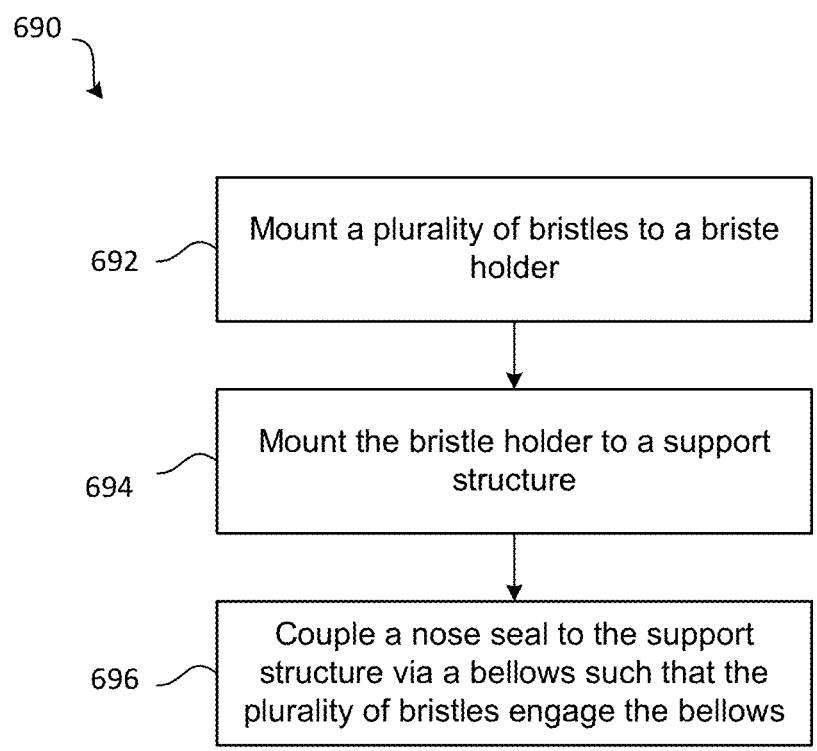
FIG. 6 is a schematic flow chart diagram of a method of assembling a gas turbine engine, in accordance with various embodiments.

In various embodiments, and with reference to FIG. 6, a method 690 of assembling a gas turbine engine is provided. The method 690 may include mounting a plurality of bristles to a bristle holder at step 692. Step 692 may include wrapping a wire or other such filament around an anchor formed in the bristle holder and applying an epoxy or adhesive to seal the filament to the anchor. In various embodiments, the method 690 further includes mounting the bristle holder to a support structure of the gas turbine engine at step 694. Still further, the method 690 may include coupling a seal nose to the support structure via a bellows such that the plurality of bristles engage, at least partially, the bellows at step 696. Step 694 may include mounting the bristle holder radially outward of the bellows. In various embodiments, the steps 692, 694, 696 of the method 690 may be performed with the intent to achieve the aforementioned overlap between the tips of the bristles and the bellows.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly comprising:
   a seal nose configured to be in sealing contact with a rotating seal plate;
   a bellows extending between and coupling the seal nose to a support structure; and
   a plurality of bristles mounted to and extending from the support structure toward the bellows, wherein at least one bristle of the plurality of bristles is in contact with the bellows to damp vibration of the bellows;
   wherein only respective tips of the plurality of bristles overlap edges of the bellows.

2. The seal assembly of claim 1, wherein the plurality of bristles are resiliently flexible.

3. The seal assembly of claim 1, wherein the bellows is resiliently flexible.

4. The seal assembly of claim 1, further comprising a bristle holder mounted to the support structure, wherein the plurality of bristles is mounted to and extends from the bristle holder.

5. The seal assembly of claim 4, wherein:
   the bellows is an annular structure;
   the annular structure of the bellows defines a radial direction, an axial direction, and a circumferential direction;
   the plurality of bristles are disposed radially outward of the bellows; and
   the respective tips are radially inward tips and the edges are radially outward edges.

6. The seal assembly of claim 5, wherein each bristle of the plurality of bristles extends radially such that each bristle is parallel to the radial direction.

7. The seal assembly of claim 5, wherein each bristle of the plurality of bristles extends in a slanted direction relative to the radial direction.

8. The seal assembly of claim 7, wherein the slanted direction is orthogonal to the axial direction along the length of each bristle.

9. The seal assembly of claim 1, wherein the plurality of bristles comprises a metallic material.

10. The seal assembly of claim 1, wherein the plurality of bristles comprises a thermoplastic material.

11. A gas turbine engine having an engine central longitudinal axis, wherein a radial direction, an axial direction, and a circumferential direction are defined relative to the engine central longitudinal axis, the gas turbine engine comprising:
    a bearing compartment comprising a rotational member; and
    a seal assembly comprising:
       a support structure,
       a rotating sealing plate;
       a seal nose in sealing contact with the rotating seal plate;
       a bellows extending between and coupling the seal nose to the support structure; and
       a plurality of bristles mounted to and extending from the support structure to engage the bellows, wherein the plurality of bristles are configured to damp vibration of the bellows, wherein only respective tips of the plurality of bristles overlap edges of the bellows.

12. Gas turbine engine of claim 11, further comprising a bristle holder mounted to the support structure, wherein the plurality of bristles is mounted to and extends from the bristle holder.

13. The gas turbine engine of claim 12, wherein:
the bellows is annular around the engine central longitudinal axis; and
the plurality of bristles are disposed radially outward of the bellows.

14. The gas turbine engine of claim 13, wherein each bristle of the plurality of bristles extends radially such that each bristle is parallel to the radial direction.

15. The gas turbine engine of claim 13, wherein each bristle of the plurality of bristles extends in a slanted direction relative to the radial direction.

16. The gas turbine engine of claim 15, wherein the slanted direction is orthogonal to the axial direction along the length of each bristle.

17. The gas turbine engine of claim 13, wherein the plurality of bristles is annular around the engine central longitudinal axis.

18. The gas turbine engine claim 13, wherein the plurality of bristles comprises multiple sections of bristles that are circumferentially distributed around the engine central longitudinal axis.

19. A method of assembling a gas turbine engine, the method comprising:
mounting a plurality of bristles to a bristle holder;
mounting the bristle holder to a support structure of the gas turbine engine; and
coupling a seal nose to the support structure via a bellows, wherein only respective tips of the plurality of bristles overlap edges of the bellows.

20. The method of claim 19, wherein mounting the bristle holder to the support structure comprises positioning the bristle holder radially outward of the bellows.

* * * * *